INVENTOR.
Thomas L. Robinson
BY
Popp and Sommer
ATTORNEYS.

INVENTOR.
Thomas L. Robinson
BY
Popp and Sommer
ATTORNEYS 3,312,825

PANEL USING INTRINSIC OR CARRIER-INJECTION ELECTROLUMINESCENCE USABLE IN AN IMAGE CONVERTER

Thomas L. Robinson, Buffalo, N.Y., assignor to Cornell Aeronautical Laboratory, Inc., Buffalo, N.Y., a corporation of New York Filed Dec. 26, 1962, Ser. No. 246,981
15 Claims. (Cl. 250—213)

This invention relates to an improved electroluminescent panel.

The primary object of the present invention is to provide an electroluminescent panel which glows with greater brilliance for a given impressed voltage than the panel.

Another general object is to provide such a panel which has a simple construction so as to be amenable to mass production preferably using printed circuit and photomechanical techniques.

Another object is to provide such a panel which has a thin cross section and can be produced with large or small surface areas depending on the application.

Another object is to provide an electroluminescent panel which by the proper selection of materials of construction is capable of operating as a lamp producing a panel of light or as a converter to change an infrared image to a visible light image.

A more specific object is to provide an infrared image conversion panel which is non-scanning and direct viewing.

Another object is to provide an infrared image conversion panel which has a high resolution.

Another object is to provide such an infrared image conversion panel which may be operated at room temperature.

Another object is to provide an electroluminescent panel which when used as a lamp has a construction which lends itself to cooling, if desired, by simple cooling instrumentation.

Still other objects and advantages of the invention will be apparent from the following description of preferred embodiments thereof illustrated in the accompanying drawings wherein.

The present invention provides an electroluminescent panel which includes an insulated substrate having a surface on which first semiconductor elements are arranged in first rows and also on which second semiconductor elements are arranged in second rows alternately disposed with said first rows, and means arranged only on one and the same side of said first and second elements for impressing an electrical potential across said first and second rows.

FIGS. 1–4

Figure 1:
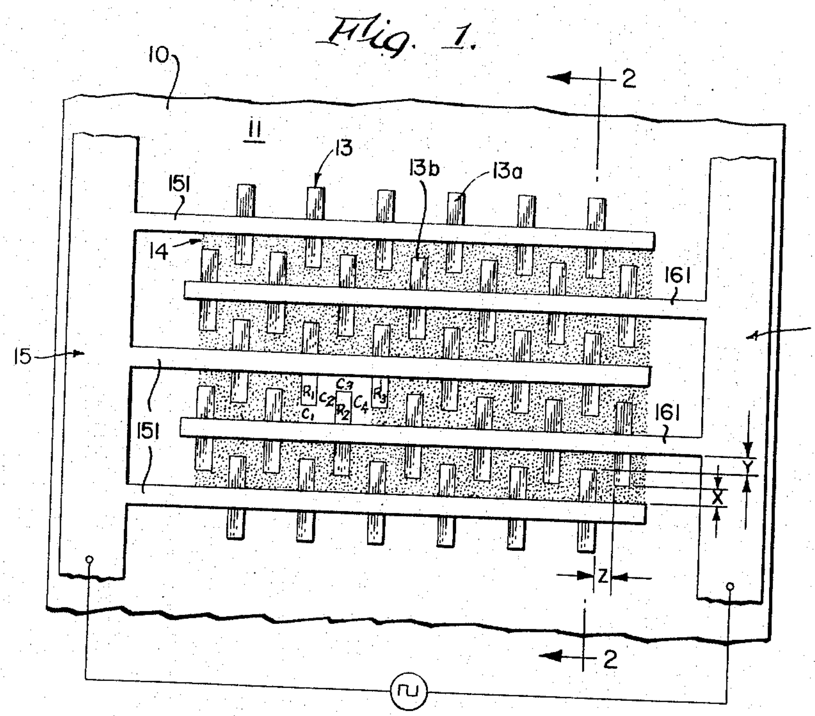
FIG. 1 is a fragmentary schematic elevational view of one face of one form of electroluminescent panel constructed in accordance with the present invention and operating on the principle of intrinsic electroluminescence and showing certain elements on a greatly exaggerated scale for clarity of illustration.
Figure 2:
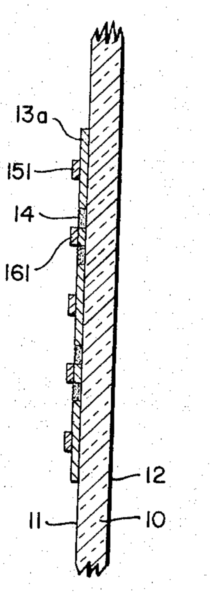
FIG. 2 is a vertical sectional view thereof, still schematic, taken on line 2—2, FIG. 1.

The panel shown in FIGS. 1 and 2 operates on the principle of intrinsic electroluminescence or the Destrian effect which characterizes the emission of light by a phosphor when subjected only to the action of a varying electric field.

The electroluminescent panel shown in FIGS. 1 and 2 comprises an insulating substrate or base 10 having flat and parallel opposite surfaces 11 and 12. On the surface 11 is arranged a mosaic of thin-film semiconductor elements 13 and a coplanar layer of a suitable electroluminescent phosphor 14 which is interposed between and contacts the elements.

The semiconductor elements 13 are shown as arranged in rows so that elements indicated at **13*a* form one row and elements 13*b* form another row, and the rows alternate across the surface 11**.

Means are provided for applying or impressing an electric potential across the adjacent rows of semiconductor elements **13*a* and 13*b*. Such means are shown as comprising interdigital electrodes of ohmic terminals 15 and 16 each having finger contacts or strips, indicated at 151 for the terminal 15 and at 161 for the terminal 16. The contacts 151 severally are shown as overlying and electrically contacting the rows of semiconductor elements 13*a*. The contacts 161 severally are shown as overlying and electrically contacting the rows of semiconductor elements 13*b*. The voltage impressed across the terminals 15 and 16 must be variable, such as an A.C. voltage produced by a square wave or a pulsating D.C. voltage. The panel may be constructed so that the terminals 15 and 16 underlie the elements 13** instead of overlying them.

Preferably the semiconductor elements 13 have a generally rectangular outline so that the outer ends thereof have a pair of points or corners. Due to the spreading resistance of such point contacts with the electroluminescent phosphor 14, the average voltage needed to operate the panel is comparatively low. The semiconductor elements 13 are thin in a direction perpendicular to the surface 11. Typically, the elements 13 have a thickness of only one micron and a width of twenty-five microns.

Examples of semiconductors which may be used for the elements 13 are lead sulfide, lead selenide, germanium, silicon, or mixtures of these materials. If the panel is to be used as an infrared image converter, the semiconductor elements 13 are composed of a photosensitive semiconductive material, herein sometimes also termed a photoconductive material. If the panel is to be used as a lamp, the elements 13 are composed of a highly degenerate semiconductive material.

The layer 14 is also very thin in a direction normal to the surface 11 and may be composed of any suitable electroluminescent phosphor such as the zinc sulfide type phosphors.

The electrode terminals 15 and 16 are likewise very thin in a direction normal to the surface 11 and may be made of any suitable conductive metal such as gold.

If the panel is to be used as an infrared image converter, the substrate 10 must be of light transmissive material such as transparent or transluscent glass, plastic or mica. If the panel is to be used as a lamp, the substrate 10 need not be light transmissive although it can be, and may be made of an opaque material such as a thin metal sheet, for example foil, which has been vapor-coated with SiO or $SiO_2$ to form a flexible insulated sheet.

An important feature of the present invention is that the thin-film semiconductor elements 13 and the electroluminescent phosphor layer 14 are coplanar. The elements 13 in adjacent rows are shown as interdigitally arranged with respect to one another. Thus an element 13*a* projects between and spatially overlaps an opposing pair of elements 13*b*. Similarly, an element 13*b* projects between and spatially overlaps an opposing pair of elements 13*a*.

Assuming the panel is constructed of materials so as to be useful as an infrared image converter, it operates on the principle of the photosensitive semiconductor elements 13 being used to control the amount of light emitted from the electroluminescent phosphor 14. A voltage the frequency of which will be determined by the impedance of the device is applied across the series connected electroluminescent phosphor 14 and the photoconductive elements 13. The level of the voltage applied to the terminals 15 and 16 of the panel is adjusted so that in the absence of infrared radiation impinging against the elements 13 no visible light is emitted from the phosphor 14. In this condition, the voltage across the phosphor is below threshold level for excitation because a large portion of the total supply voltage appears across the photoconductive elements 13 which have a high, dark resistance. However, when infrared radiation impinges on the image conversion panel, on that side represented by the surface 11, the resistance of each of the radiation-excited photoconductive elements 13 decreases in proportion to the intensity of the absorbed radiation. As the resistance of each of the photoconductive elements 13 decreases, a correspondingly increasing voltage appears across the adjoining phosphor areas. Thus, the panel emits light at the discrete areas of infrared excitation and the visible light image so created is viewable through the light transmissive substrate from the viewing side of the panel which is one the side represented by the surface 12.

Figure 3:
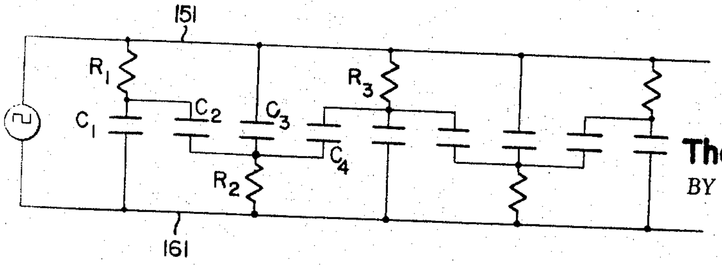
FIG. 3 is a diagram depicting the equivalent electrical circuit of the panel shown in FIG. 1.

FIG. 3 shows the equivalent electrical circuit for the electroluminescent panel shown in FIGS. 1 and 2 in which the resistors R1, R2, R3 and the capacitors C1, C2, C3 and C4 are correspondingly labeled in FIGS. 1 and 3, the resistors being semiconductor elements 13 and capacitors being portions of the phosphor layer 14.

If an electroluminescent panel is constructed of materials so as to be useful as a lamp or illuminated display panel over its entire surface, a voltage is impressed across the terminals 15 and 16 which will excite the layer of electroluminescent phosphor 14 causing it to emit light.

While the electroluminescent panel shown in FIGS. 1–3 may be constructed in any suitable manner, the following is a preferred procedure for producing an infrared image conversion panel.

The photoconductive material of which the elements 13 are to be made is first deposited on the surface 11 of the light transmissive insulating substrate 10. Such deposition may be by means of vacuum or chemical composition in a thin film, approximately one micron thick, followed by the deposition of a set of the interdigital electrode terminals 15 and 16. The film is then heat treated in the presence of oxygen to sensitize the layer. A mosaic is then formed in the sensitized film by applying a thin photoresist over the layer and subsequently exposing it to ultra-violet radiation through a photographic transparency of the desired pattern. The photosensitive resist is then subjected to a developing process which removes the unexposed areas, thus exposing unwanted areas of photoconductive material which are later etched away in an acid solution. The fixed photoresist which covers the remaining mosaic is dissolved away by a solvent solution.

Following this, an electroluminescent phosphor, which is dispersed in a photosensitive binder, is deposited in a thin layer over the entire sensitive side of the panel. Next, the phosphor layer is exposed to ultra-violet radiation through the light transmissive substrate 10. In this operation, the photoconductor mosaic and the interdigital terminals act as the opaque areas of a photographic transparency to define the pattern of the electroluminescent phosphor layer which is to be fixed. The photosensitive binder is developed and the unexposed areas thereof are removed, leaving only the phosphor-loaded fixed resist which remains only in the areas between the elements 13 and the interdigital electrode terminals 15 and 16. Finally, a thin, transparent coating (not shown) may be applied over the photoconductive side of the mosaic for protection against environmental damage.

The percentage of light-to-dark areas obtainable, i.e. the ratio of active phosphor areas to opaque areas, is of the order of 85 percent of more, and can be maximized by properly adjusting the width of the interdigital terminals, and the aspect ratio of the semiconductor elements. However, in adjusting the dimensions of the electrodes and mosaic elements, the spacings labeled X, Y and Z in FIG. 1 should remain equal so that the light output across these points will be equal for equal voltage drops, i.e. the capacitive reactances must be equal for the same unit area.

A resolution approaching $10^6$ photoconductor elements per square inch is possible and depends only on the ability to resolve lines of the order of 8 to 9 microns in width. This is not a difficult task with proper photomechanical equipment.

A non-scanning, direct viewing infrared image conversion panel may be used for many purposes, such as to detect missile plumes where the point of radiation changes very rapidly with time, or in anti-submarine warfare to serve as an instantaneous visual plot of the speed and direction of infrared emitting warm water rising from around a submerged submarine, or to visually display a picture of geophysical phenomenon which emits infrared radiation.

Figure 4:
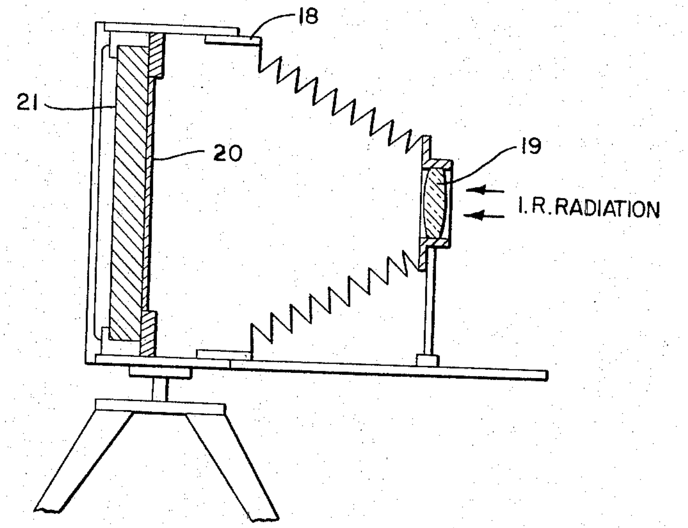
FIG. 4 is a diagrammatic view of an infrared camera incorporating the panel shown in FIG. 1.

A simple application of the image converter in an infrared camera is illustrated in FIG. 4. As there shown, a standard camera body 18 has been modified by removing the shutter and lens, and adding a sapphire lens 19 and the intrinsic infrared image conversion panel indicated generally at 20. A pack of photographic film indicated at 21 is placed against the visual display surface of the image converter, or the surface 12 shown in FIG. 2, so that an undistorted exposure can be obtained. A shutter is not necessary for the camera because the conversion panel 20 prevents direct illumination of the film in the pack 21. However, when an infrared scene is to be photographed, the mosaic on the panel 20 is energized by applying a burst of the A.C. supply voltage. The image converter instantly transforms the infrared scene to a visible light scene which exposes the photographic film. Exposure time can be varied by controlling the converter supply voltage.

FIGS. 5–7

Figure 5:
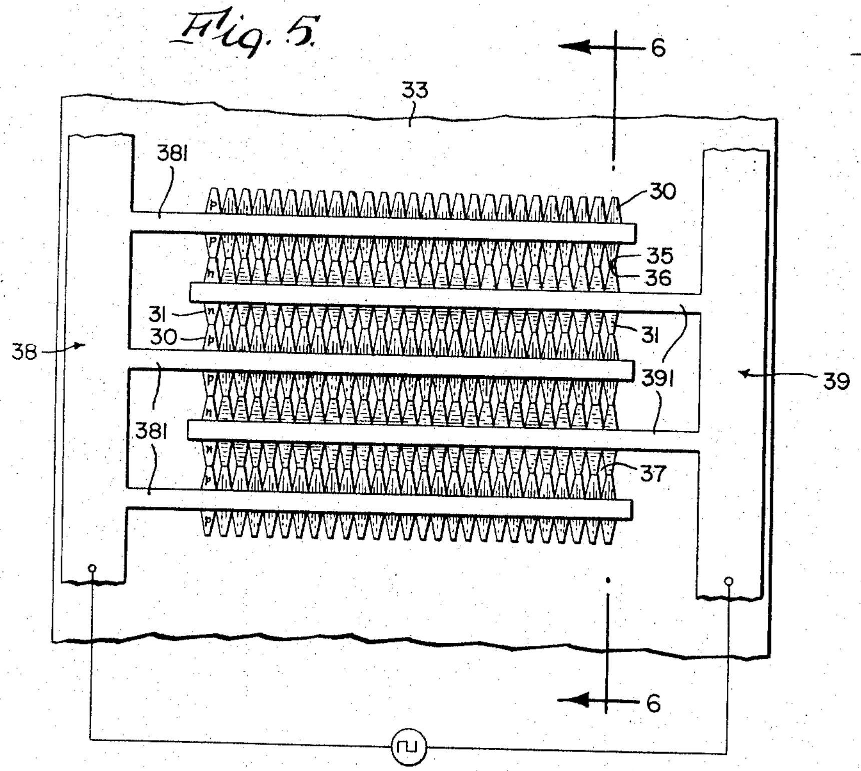
FIG. 5 is a fragmentary schematic face view, similar to FIG. 1, of another form of electroluminescent panel constructed in accordance with the present invention and operating on the principle of injection electroluminescence.
Figure 6:
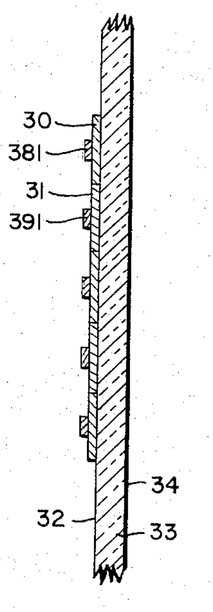
FIG. 6 is a vertical sectional view thereof, still schematic, taken on line 6—6, FIG. 5.
Figure 7:
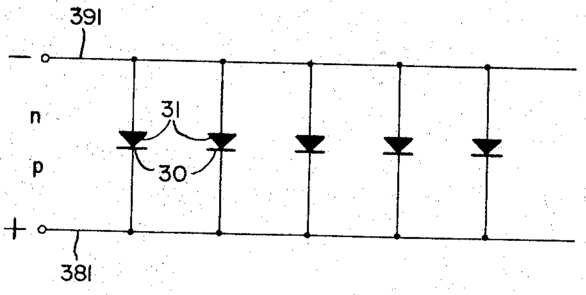
FIG. 7 is a diagram depicting the equivalent electrical circuit of the panel shown in FIG. 5.

The form of panel shown in FIGS. 5–7 operates on the principle of carrier-injection electroluminescence. This principle is definitive of the condition where light is emitted by the sole action of an electric field on particles in contact with conducting electrodes so that current injection can occur.

The injection type electroluminescent panel is shown as comprising a mosaic of thin-film p- and n-type semiconductor elements 30 and 31, respectively, arranged in a coplanar manner on the surface 32 of an insulating substrate 33 which has an opposite surface 34. The p-type elements 30 are shown arranged in rows alternating with rows of the n-type elements 31. Each of the elements 30 and 31 is shown as having a tapered or narrowed portion terminating in a transverse edge indicated at 35 in the case of a p-type element 30 and at 36 in the case of an n-type element 31. The elements 30 and 31 are arranged in direct opposing relation so that the transverse edge 35 of an element 30 abuts a transverse edge 36 of an element 31 to provide a p-n junction. A diamond-shaped space 37 thus exists between opposing pairs of adjacent semiconductor elements.

The elements 30 being made of a p-type semiconductive material have a predominance of holes or positive charges. The elements 31 being composed of an n-type semiconductive material have a predominance of electrons or negative charges. The tapered construction of the ends of the elements 30 and 31 is to concentrate the electric current which flows across the p-n junction.

Suitable means are provided for applying electric potential acros the p-n junctions. As in the case of the other form of the invention, this is preferably accomplished by interdigital electrodes or ohmic terminals 38 and 39. The terminal 38 has fingers or strips 381 which traverse and electrically contact the p-type elements 30 in a given row thereof. Similarly, the terminal 39 has fingers or strips 391 which traverse and electrically contact the n-type elements 31 in a given row thereof. Subjecting the p-n junctions to a D.C. voltage causes electroluminescence at the junctions. The brilliance of the light at a given p-n junction depends upon the current density flowing across the junction.

If the elements 30 and 31 are made of a photosensitive semiconductive material so that their resistance will vary with exposure to infrared radiation, the panel shown in FIGS. 5–7 can be used as an infrared image converter. The infrared radiation impinging upon the exposed faces of the p- and n-type semiconductor elements 30 and 31 causes the p-n junctions to modulate or vary the D.C. injection biasing current which flows across the junctions, thereby modulating the injection luminescence emitted at the junction.

In FIG. 7, the equivalent electrical circuit for the injection type panel is depicted. The pairs of p- and n-type elements are analgous to p-n diodes in parallel.

The injection type panel does not need electroluminescent phosphors to produce visible light. However, it may be advantageous to fill the diamond shaped open areas 37 between opposing pairs of elements 30 and 31 with a storage phosphor layer which can be excited from second order effects of the injected luminescence so as to store the light image.

The injection electroluminescent panel generates heat. To reduce this heat the D.C. voltage is preferably pulsed. As well, it may be necessary to cool the panel. Because of the thin and flat geometrical shape of the panel, it is readily adapted to the flow of a suitable cooling fluid over the surface of the panel and only simple cooling instrumentation (not shown) is required for this purpose.

If the injection type panel is desired to be used as a lamp, the elements 30 and 31 can be made of a degenerate semiconductive material which does not have to be photosensitive. Modulating the biasing current will modulate the light emitted at the p-n junctions.

The elements 30 and 31 may be formed by applying a thin film of a suitable semiconductive material such as lead sulfide on the surface 32 of the insulating substrate 33. This may be achieved by vacuum or chemical deposition through a mask to leave the uncovered spaces 37, or these spaces may be otherwise provided. Next the terminals 38 and 39 can be added by evaporation through a mask. The assembly is then heated in a vacuum chamber to render the total exposed semiconductor area either p- or n-type by introducing controlled amounts of impurities in the form of vapors or gases. For example, if lead sulfide is the photoconductive material to be rendered p-type, a hydrogen sulfide atmosphere will donate more sulfur into the material; or if the material is to be rendered n-type, an oxygen atmosphere will accept sulfur. The sulfur may also be out-diffused in a high vacuum, thus leaving the treated area with an excess of lead, hence rendering it n-type. Then by covering the areas to be left unaffected, the uncovered areas can be treated to make them of the other type.

From the foregoing, it will be seen that the present invention achieves the various objects stated. Since the embodiments shown and described are intended as illustrative and not limitative, the scope of the present invention is to be measured by the impended claims.

What is claimed is:

1. An electroluminescent panel, comprising an insulating substrate having a surface, a first row of first semiconductor elements arranged on said surface, a second row of second semiconductor elements arranged on said surface and spaced from said first elements, electroluminescent phosphor on said surface occupying the space between, contacting and of substantially the same thickness as said first and second elements, and means arranged only on one and the same side first and second elements for impressing an electrical potential across said rows.

2. An electroluminescent panel, comprising an insulating substrate having a surface, a mosaic on said surface including first and second semiconductor elements and electroluminescent phosphor interposed between and contacting said elements, said first elements being arranged in a first row and spaced at intervals therealong, said second elements being arranged in a second row and spaced at intervals therealong and severally projecting between said first elements and spaced therefrom, a first terminal strip electrically connected to said first elements, and a second terminal strip electrically connected to said second elements.

3. An electroluminescent panel, comprising an insulating substrate having a surface, a mosaic on said surface including interdigitally arranged and spaced first and second semiconductor elements and electroluminescent phosphor interposed between, contacting and of substantially the same thickness as said elements, and interdigitally arranged electrode terminals severally electrically connected to said first and second elements and disposed only on one and the same side thereof.

4. In an electroluminescent panel, the combination comprising spaced, generally parallel first and second terminal strips, first semiconductor elements electrically connected to said first terminal strip and extending laterally therefrom at spaced intervals therealong, second semiconductor elements electrically connected to said second terminal strip and extending laterally therefrom at spaced intervals therealong, said first element being coplanar with and spaced from said second elements, the outer portion of each of said first and second elements being formed to provide a pair of points, and electroluminescent phosphor interposed between contacting and of substantially the same thickness as first and second elements, said terminal strips being arranged only on one and the same side of said first and second elements.

5. In an electroluminescent panel, the combination comprising spaced, generally parallel first and second terminal strips, first semiconductor elements electrically connected to said first terminal strip and extending laterally therefrom at spaced intervals therealong, second semiconductor elements electrically connected to said second terminal strip and extending laterally therefrom at spaced intervals therealong and severally projecting between said first elements and spaced therefrom; the outer portion of each of said first and second elements being generally rectangular in outline thereby having an end edge and side edges, said first elements being coplanar with, said second elements, the spacing between opposing ones of said side edges being substantially equal to the spacing between said end edge and the opposing one of said terminal strips, and electroluminescent phosphor interposed between and contacting said first and second elements.

6. In an electroluminescent panel, the combination comprising a pair of spaced coplanar semiconductor elements across which an electrical potential can be applied, and electroluminescent phosphor interposed between, contacting said elements.

7. In an electroluminescent panel, the combination comprising spaced first and second coplanar electrode terminals, first semiconductor elements electrically connected to said first terminal, second semiconductor elements electrically connected to said second terminal, said first elements being coplanar with and spaced from said second elements, and electroluminescent phosphor interposed between, contacting and of substantially the same thickness as said first and second elements.

8. An electroluminescent panel operating on the principle of intrinsic electroluminescence, comprising a light transmissive insulating substrate having a surface, alternately arranged rows of coplanar and spaced first and second photosensitive semiconductor elements supported on said surface, a layer of electroluminescent phosphor supported on said surface and occupying the space between, contacting and of substantially the same thickness as said first and second elements, and interdigital electrode terminals severally electrically connected to said first and second elements and arranged only on one and the same side thereof, whereby an infrared image impinging said elements is converted to a visible light image viewable through said substrate.

9. An electroluminescent panel, comprising an insulating substrate having a surface, a first row of p-type semiconductor elements arranged on said surface and individually having a narrowing portion terminating in a transverse end, a second row of n-type semiconductor elements arranged on said surface and individually having a narrowing portion terminating a transverse end, said ends of said first row severally abutting said ends of said second row to provide p-n junctions, a first electrode terminal electrically connected to said p-type elements, and a second electrode terminal electrically connected to said n-type elements.

10. In an electroluminescent panel, the combination comprising spaced first and second electrode terminals, p-type semi-conductor elements electrically connected to said first terminal, and n-type semiconductor elements coplanar with said p-type elements and severally contacting the same to provide p-n junctions and electrically connected to said second terminal.

11. In an electroluminescent panel, the combination comprising a p-type semiconductor element having a narrowing portion terminating in a transverse end, an n-type semiconductor element coplanar with said p-type element and having a narrowing portion terminatnig in a transverse end which abuts the first mentioned end to provide a p-n junction, and means for impressing an electrical potential across said junction, said first and second terminals being arranged only on one and the same side of said p-type and n-type elements.

12. An electroluminescent panel, comprising an insulating substrate having a surface, a mosaic on said surface including alternately arranged rows of p- and n-type semiconductor elements, said elements individually having a narrowing portion terminating in a transverse end, said end of a p-type element opposing and abutting said end of an n-type element, a space existing between opposing pairs of adjacent semiconductor elements, said mosaic also including photoluminescent phosphar elements filling said spaces and contacting the adjacent semiconductor elements, and interdigitally arranged electrode terminals severally connected to said p- and n-type elements.

13. An electroluminescent panel, comprising a light transmissive base having a surface, p-type semiconductor elements arranged on said surface in first rows, n-type semiconductor elements of substantially the same thickness as said p-type elements and arranged on said surface in second rows alternately disposed with said first rows, the opposing ends of said elements contacting to provide p-n junctions, and means arranged only on one and the same side of said first and second elements for impressing an electrical potential across said junctions.

14. An electroluminescent panel, comprising a light transmissive base having a surface, p-type semiconductor elements arranged on said surface in first rows, n-type semiconductor elements arranged on said surface in second rows alternately disposed with said first rows, the opposing ends of said elements contacting to provide p-n junctions, a first electrode terminal electrically connected to said p-type elements, and a second electrode terminal connected to said n-type elements, said terminals being arranged only one and the same side of said p-type and n-type elements.

15. An electroluminescent panel operating on the principle of carrier-injection electroluminescence, comprising a light transmissive insulating substrate having a surface, alternately arranged rows of coplanar photosensitive p- and n-type semiconductor elements supported on said surface and having opposing and abutting narrowing end portions to provide p-n junctions, and interdigital electrode terminals severally electrically connected to said p- and n-type elements, whereby an infrared image and impinging said elements is converted to a visible light image viewable through said substrate.

References Cited by the Examiner

UNITED STATES PATENTS

| | | | |
|---|---|---|---|
| 2,768,310 | 10/1956 | Kazan et al. | 250—211 |
| 2,789,193 | 4/1957 | Anderson | 250—211 X |
| 2,846,592 | 8/1958 | Rutz | 250—211 |
| 2,894,145 | 7/1959 | Lehovec | 250—213 X |
| 2,904,697 | 9/1959 | Halsted | 250—213 |
| 2,916,630 | 12/1959 | Rosenberg | 250—213 |
| 2,972,076 | 2/1961 | Van Lanten et al. | 250—213 X |
| 2,984,749 | 5/1961 | Ross | 250—213 |
| 2,999,942 | 9/1961 | Klasens et al. | 250—213 |
| 3,015,034 | 12/1961 | Hanlet | 250—213 |
| 3,039,005 | 6/1962 | O'Connell et al. | 250—213 |
| 3,043,958 | 7/1962 | Diemer | 250—213 |

RALPH G. NILSON, *Primary Examiner.*

ARCHIE R. BORCHELT, *Examiner.*

E. STRICKLAND, M. A. LEAVITT, *Assistant Examiners.*